(12) United States Patent
Kodama

(10) Patent No.: US 6,505,319 B1
(45) Date of Patent: Jan. 7, 2003

(54) SIGNAL PROCESSING CIRCUIT AND INFORMATION RECORDING APPARATUS

(75) Inventor: Kunihiko Kodama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/573,616

(22) Filed: May 17, 2000

(30) Foreign Application Priority Data

May 17, 1999 (JP) .......................................... 11-135351

(51) Int. Cl.[7] .............................................. H03M 13/00
(52) U.S. Cl. ........................ 714/752; 714/757; 714/763
(58) Field of Search ............................ 395/128; 710/7; 709/231; 711/168; 714/752, 757, 763, 758, 766

(56) References Cited

U.S. PATENT DOCUMENTS

| | | | | |
|---|---|---|---|---|
| 5,065,346 A | * | 11/1991 | Kawai et al. ................ | 395/128 |
| 5,745,785 A | * | 4/1998 | Shoji et al. ..................... | 710/7 |
| 5,764,893 A | * | 6/1998 | Okamoto et al. ........... | 709/231 |
| 5,903,532 A | | 5/1999 | Ikeda | |
| 5,905,864 A | * | 5/1999 | Terasima et al. ............ | 711/168 |

FOREIGN PATENT DOCUMENTS

JP    10-143446    5/1998

* cited by examiner

*Primary Examiner*—David Ton
(74) *Attorney, Agent, or Firm*—Oblon, Spivak, McClelland, Maier & Neustadt, P.C.

(57) ABSTRACT

A signal processing circuit and an information recording apparatus in which a memory section has two storage areas each of which has a capacity for at least one block of record data and which are alternately switched to a parity-added data storage area where record data added with a parity by a parity adding section is stored and a transmission area into which the parity-added record data is read and transmitted by a transmission section, and the parity adding section starts adding the parity to record data upon reception of record data for one row of error correcting codes.

20 Claims, 7 Drawing Sheets

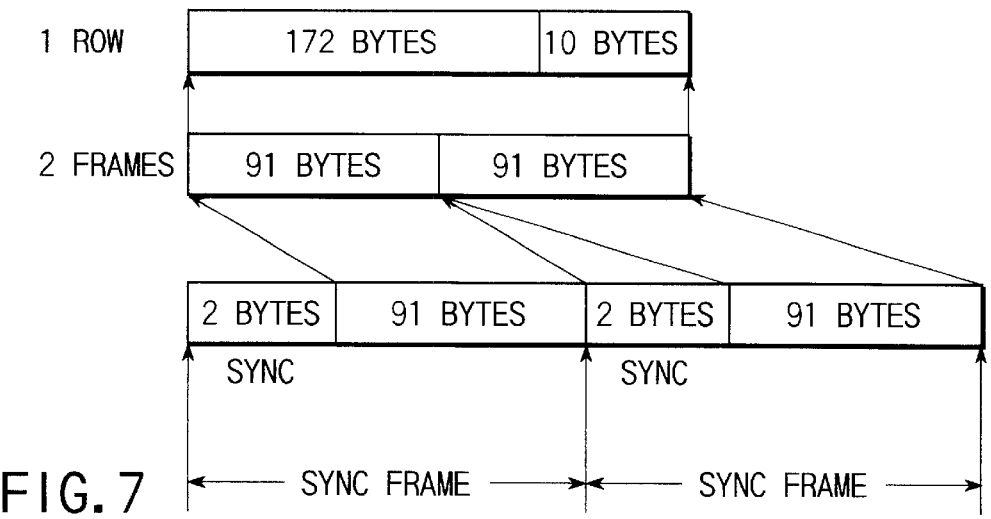
FIG. 6
FIG. 7
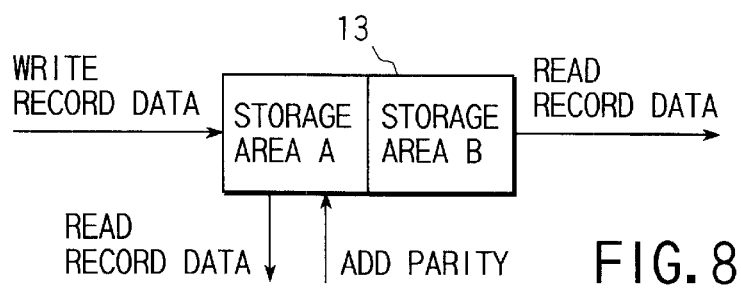
FIG. 8

SIGNAL PROCESSING CIRCUIT AND INFORMATION RECORDING APPARATUS

CROSS-REFERENCE TO RELATED APPLICATIONS

This application is based upon and claims the benefit of priority from the prior Japanese Patent Application No. 11-135351, filed May 17, 1999, the entire contents of which are incorporated herein by reference.

BACKGROUND OF THE INVENTION

The present invention relates to a signal processing circuit for recording information on a recording medium, such as a DVD-RAM, and an information recording apparatus.

Recently have been developed optical disks, such as a CD-R and DVD-RAM, as rewritable recording media. A recording system which uses those optical disks needs to record a vast amount of information at a high speed and accurately reproduce recorded information. To achieve the requirements, an error correcting code is recorded together with record data.

FIG. 1 shows a conventional signal processing circuit which is used to add the parity of such an error correcting code to record data. When receiving record data supplied externally, a reception circuit 1 temporarily writes the record data in a memory section 3 constituted of a RAM or the like via an arbiter 2. A parity adding circuit 4 reads record data, written in the memory section 3, adds the parity of an error correcting code to the record data and writes back the parity-added record data into the memory section 3 via the arbiter 2.

A transmission circuit 5 reads the record data, added with a parity by the parity adding circuit 4, from the memory section 3 and sends the record data to a head section for recording information on a recording medium. At this time, the record data is converted to a drive current for a semiconductor laser, incorporated in the head section, by a driver before it is supplied to the head section. The arbiter is a memory interface which arbitrates an access to the memory section 3 by the reception circuit 1, the parity adding circuit 4 and the transmission circuit 5.

FIG. 2 conceptually depicts a memory area in the memory section 3. The memory area of the memory section 3 is separated into three storage areas A, B and C whose sizes are each set approximately equal to the size of one block of data (ECC data block) in which a row of error correcting codes (ECCS) is completed.

FIG. 3 exemplarily shows a receiving process for record data, a parity adding process and a transmitting process for record data being carried out while switching the three storage areas A, B and C shown in FIG. 2 from one to another. As illustrated, when the storage area A, for example, is a location where record data is to be written in the receiving process, the record data that was written in the storage area C in the previous phase is subjected to parity addition, and the storage area B that is undergone parity addition in this previous phase is subjected to data transmission.

In the next phase, the storage area B undergoes the receiving process, the storage area A undergoes the parity adding process and the storage area C undergoes the transmitting process. As apparent from the above, the individual storage areas are switched from one process to another in cycles, phase by phase. Because this system can execute the receiving process, parity adding process and transmitting process in parallel, the processing speeds of the individual circuits need not be enhanced so much. The system however requires that the memory capacity of the memory section 3 should be at least triple the size of a ECC data block.

Because the conventional signal processing circuit which is used in adding the parity of an error correcting code to record data has three storage areas in a memory section for record data in order to perform a receiving process for record data, a parity adding process and a transmitting process for record data in parallel, enlargement of the circuit scale is inevitable.

One way (not a prior art) to reduce the circuit scale having been conceived by the inventor is to separate the memory section for record data, which has a memory capacity twice as large as the size of an ECC data block, into two storage areas and to permit one storage area to undergo a transmitting process of record data while the other storage area is subjected to a receiving process for record data and a parity adding process.

FIG. 4 exemplarily shows the execution of a receiving process for record data, a parity adding process and a transmitting process for record data by switching the two storage areas A and B of the memory section from one to the other. In this case, however, while the transmitting process for one block of record data is being carried out in one storage area, the parity adding process should be carried out in serial after the completion of the receiving process for one block of record data in the other storage area. This requires the improvement of the processing speeds of the reception circuit 1 and the parity adding circuit 4 shown in FIG. 1 in order to avoid a wasteful wait time in the transmitting process. This demands a considerable amount of burden on the individual circuits and faster data transfer.

Accordingly, it is an object of the present invention to provide a signal processing circuit which is used in adding the parity of an error correcting code to record data, can improve the speed of processing record data without significantly increasing the circuit load, and can reduce the memory capacity of storage areas for record data.

It is another object of this invention to provide an information recording apparatus equipped with such a signal processing circuit.

BRIEF SUMMARY OF THE INVENTION

To achieve the above object, according to one aspect of this invention, there is provided a signal processing circuit comprising: reception section configured to receive record data; a memory section configured to store the record data received by the reception section; a parity adding section configured to add record data stored in the memory section with a parity based on an error correcting code in a unit of record data block; and a transmission section configured to transmit parity-added record data stored in the memory section; wherein the memory section has two storage areas each of which has a capacity for at least one record data block and which are alternately switched to a parity-added data storage area where record data added with the parity by the parity adding section is stored and a transmission area from which the parity-added record data is read and transmitted by the transmission section, the reception section is configured to receive the record data in an order matched with an order of rows of error correcting codes, and the parity adding section starts adding the parity to record data upon reception of record data for one row of error correcting codes.

According to another aspect of this invention, there is provided an information recording apparatus comprising a head section for recording information on a recording medium; a reception section configured to receive record data at a time of recording information on the recording medium; a memory section configured to store the record data received by the reception section; a parity adding section configured to add record data with a parity based on an error correcting in a unit of record data block; and a transmission section configured to transmit parity-added record data stored in the memory section, wherein the memory section has two storage areas each of which has a capacity for at least one block of the record data and which are alternately switched to a parity-added data storage area where record data added with the parity by the parity adding section is stored and a transmission area into which the parity-added record data is read and transmitted by the transmission section, and the parity adding section starts adding the parity to record data upon reception of record data for one row of error correcting codes.

This invention is designed paying attention to the fact that a process of adding the parity of an error correcting code, with respect to record data externally received in an order matched with an order of rows of error correcting codes, can be carried out for a data unit of one row of error correcting codes and is characterized in that addition of a parity to record data starts upon reception of record data of at least one row corresponding to one row of error correcting codes before reception of one block of record data.

This structure can allow the memory means where record data is temporarily written to be substantially constituted of two areas, namely the parity-added data storage area and the transmission area for the parity-added record data, and can lead to a reduction in the memory capacity of the memory area for record data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram showing the structure of a data block to which the parity of an error correcting code (ECC) is added;

FIG. 7 is a diagram showing the structure of one row extracted from a record sector;

FIG. 8 is a diagram conceptually depicting a memory in a memory section;

DETAILED DESCRIPTION OF THE INVENTION

Figure 5:
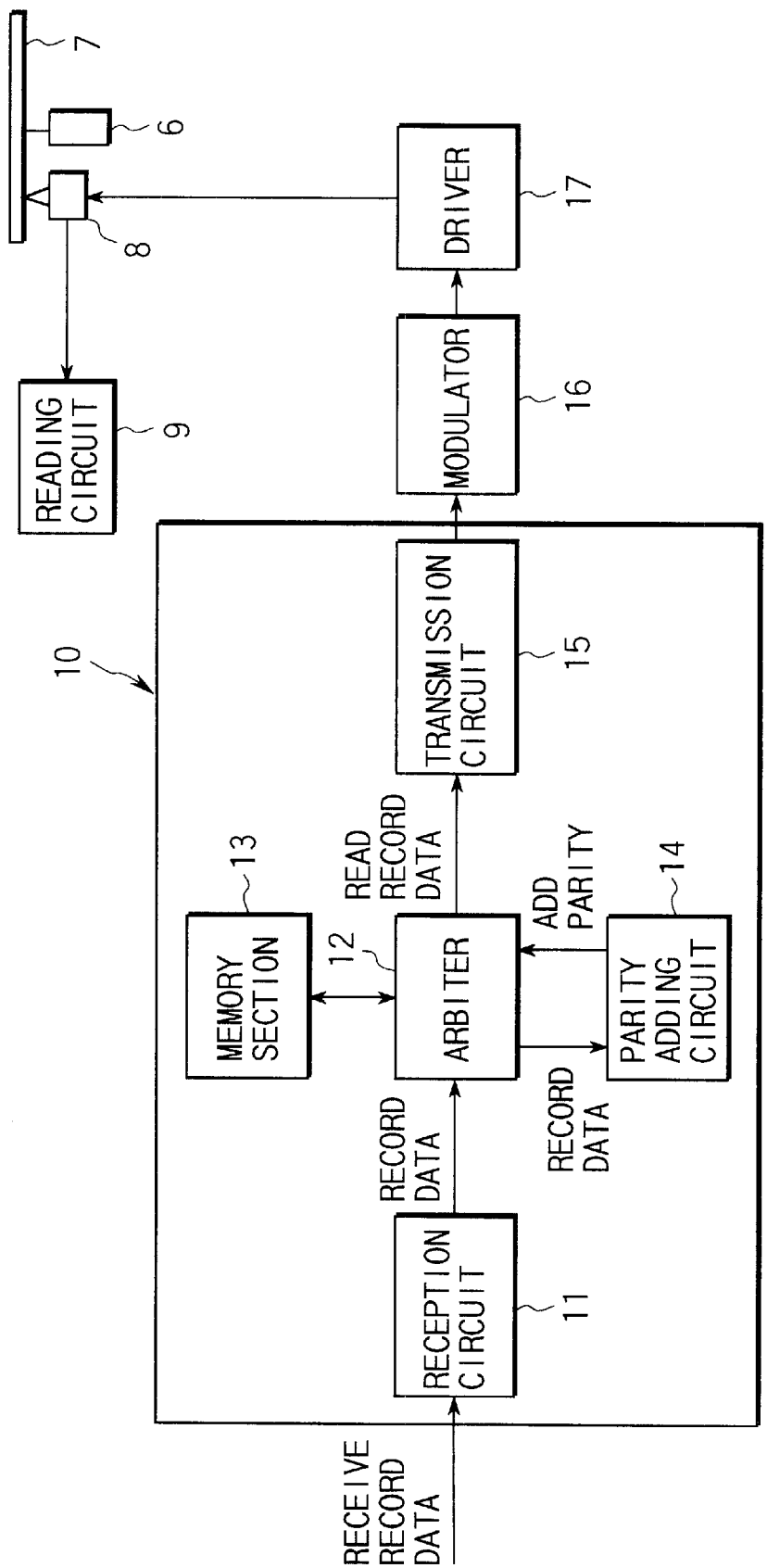
FIG. 5 is a block diagram illustrating a DVD-RAM system according to a first embodiment of this invention.

Preferred embodiments of the present invention will now be described with reference to the accompanying drawings. FIG. 5 is a block diagram illustrating a DVD-RAM system as an information recording apparatus according to the first embodiment of this invention. Although a DVD-RAM system is given as an example of the first embodiment, this invention can be adapted to other systems which can receive record data from an external unit in an order which is matched with the order of the row of error correcting codes. For instance, this invention can be adapted to systems such as DV-DR, DVD+RW and DVD−RW systems whose logical formats for one block of record data, for example, are similar to that of the DVD-RAM system.

In FIG. 5, a disk motor 6 rotates an optical disk 7 as a recording medium. A pickup 8 as a head section for recording information on the optical disk 7 emits a light beam from an incorporated semiconductor laser onto a line of pits on the optical disk 7, detects a reflected beam by means of an incorporated photodiode, and sends an acquired signal to a reading circuit 9 via an RF amplifier. As a circuit similar to an ordinary DVD-ROM, a drive circuit can be used as the reading circuit 9, the detailed description of this reading circuit 9 will not be given.

A signal processing circuit 10 serves to add the parity of an error correcting code to record data to be recorded on the optical disk 7. When receiving record data from an external unit, a reception circuit 11 in the signal processing circuit 10 temporarily writes the record data in a memory section 13, constituted of a RAM or the like, via an arbiter 12. A parity adding circuit 14 generates the parity of an error correcting code for record data, reads the record data written in the memory section 13, adds this parity to that record data and writes the parity-added record data back into the memory section 13 via the arbiter 12.

A transmission circuit 15 reads record data added with the parity by the parity adding circuit 14 from the memory section 13, and sends this record data to a modulator 16, which converts 8-bit data to 16-bit data and performs addition of a sync code. Thereafter, the record data is supplied to the pickup 8 which records information on the optical disk 7. At this time, the record data is supplied to the pickup 8 after it is converted by a driver 17 to a drive current for the semiconductor laser incorporated in the pickup 8. The arbiter 12 is a memory interface which arbitrates an access to the memory section 13 by the reception circuit 11, the parity adding circuit 14 and the transmission circuit 15. Where, the reception circuit 11 receives a block of record data having an amount sufficient to complete error correction codes (ECC) and writes the received record data block into the memory section 13.

For example, when the reception circuit 11 detects a time at which record data of one row corresponding to one row of error correcting codes is received and the record data is written into the memory section 13 from the starting address, the reception circuit 11 outputs a detection signal to the parity adding circuit 14.

According to this embodiment, the memory area of the memory section 13 in the signal processing circuit 10 is separated into two storage areas A and B. The size of each storage area A or B is set approximately equal to the size of one group of data in which addition of a predetermined number of rows of error correcting codes (ECCs) to the received record data is completed corresponding to a size of an ECC data block.

Referring to FIG. 6 which shows the structure of such an ECC data block, the relationship between one block of record data and its error correcting codes will be explained below. As illustrated, one data block consists of main data of 172 (columns)×192 (rows) bytes, with a 16-byte outer code parity (P0) is added to each column and a 10-byte inner code parity (P1) added to each row, thus forming an ECC data block of 182×208 bytes. Reference symbols "B0, 0", "B0, 1" and so forth in the figure each indicates an address in a byte unit.

Every 8-bit data in this ECC data block is converted to 16-bit data after which a sync code is added to the 16-bit data, so that the ECC data block is recorded as 16 record sectors each having a data amount of 182 (columns)×13 (rows) bytes on the recording surface of the optical disk 7 while forming a series of sectors.

FIG. 7 is a diagram showing the structure of one row extracted from this record sector. Each row is comprised of two frames consisting of 91-byte data, which excludes a 2-byte sync code and consists of 1456 bits (=16 bits×91 columns). In other words, one record sector corresponds to 13×2 frames of data information recorded on the optical disk.

FIG. 8 conceptually depicts the memory area in the memory section 13 used in this invention. As mentioned above, the memory area in the memory section 13 is separated into two storage areas A and B each having a capacity approximately set to the size of the ECC data block as shown in FIG. 6.

Figure 9:
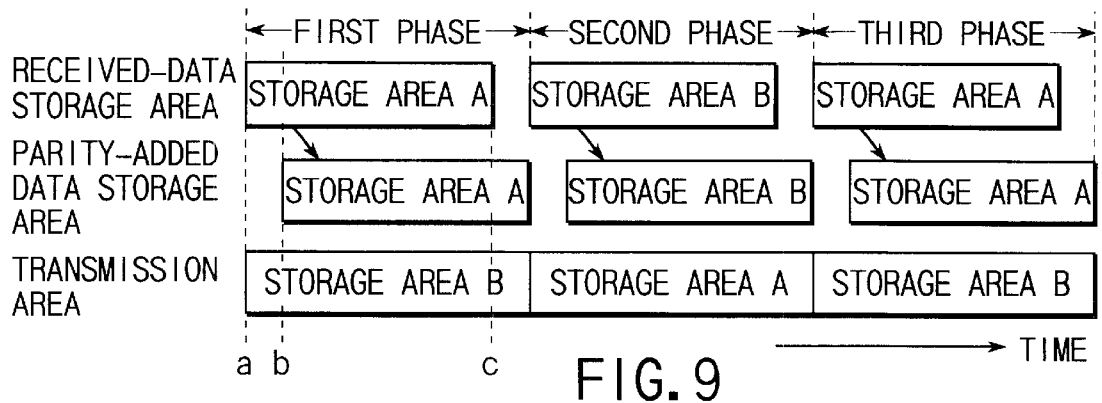
FIG. 9 is a diagram exemplarily showing the execution of a receiving process for record data, a parity adding process and a transmitting process for record data while switching two storage areas A and B of the memory section in the signal processing circuit from one to the other.
Figure 10:
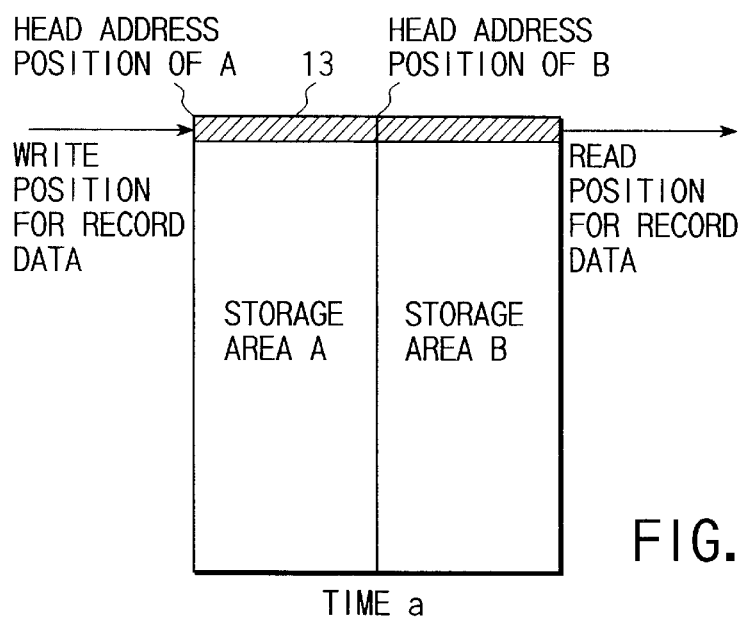
FIG. 10 is a diagram showing the states of the processes that are carried out in the two storage areas A and B of the memory section with the elapse of time.
Figure 11:
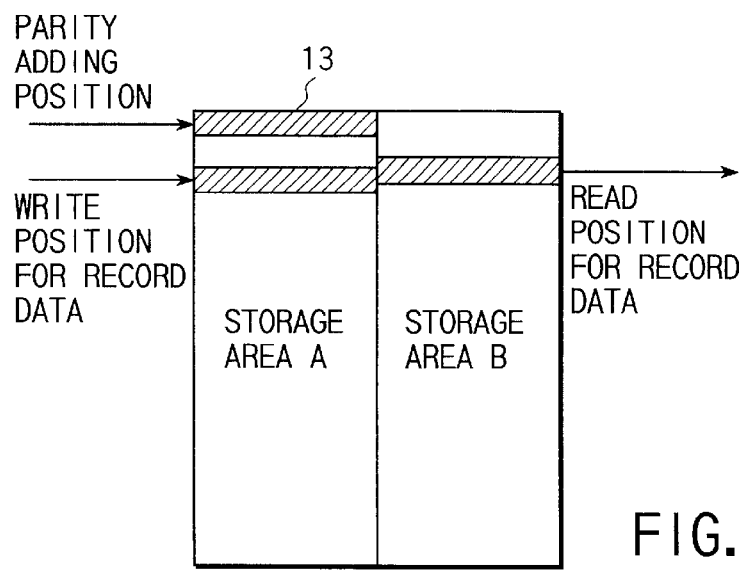
FIG. 11 is a diagram showing the states of the processes that are carried out in the two storage areas A and B of the memory section with the elapse of time.
Figure 12:
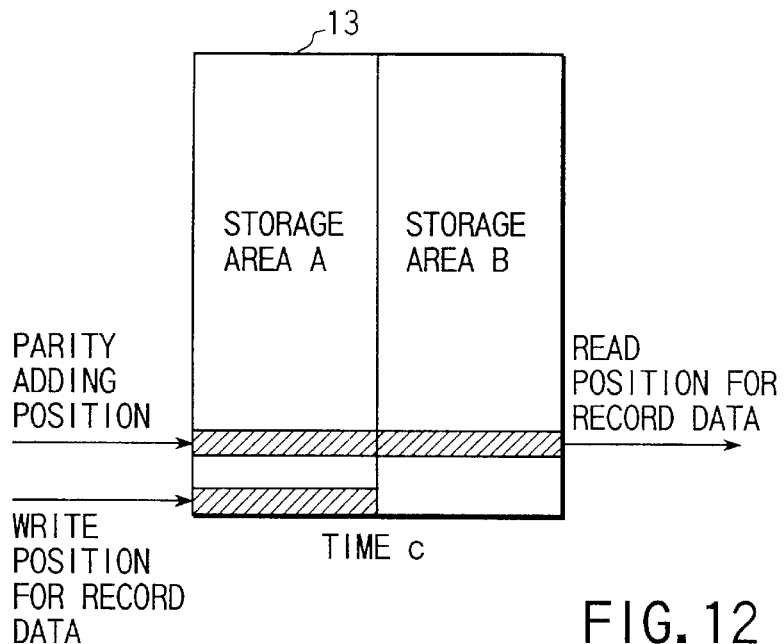
FIG. 12 is a diagram showing the states of the processes that are carried out in the two storage areas A and B of the memory section with the elapse of time.

The operation of the signal processing circuit according to this embodiment will now be described in detail with reference to FIGS. 9 through 12. FIG. 9 is a diagram exemplarily showing the execution of a process of receiving record data, a parity adding process and a transmitting process for record data while switching the two storage areas A and B of the memory section 13 in the signal processing circuit from one to the other. FIGS. 10 through 12 are diagram showing the states of the processes that are carried out in the two storage areas A and B of the memory section 13 with the elapse of time, and respectively show the processes at times a, b and c shown in FIG. 9.

In the earliest phase (first phase) in FIG. 9, the storage area A is used as a received-data storage area and a parity-added data storage area, and the reception circuit 11 in FIG. 5 receives record data externally supplied and temporarily writes the record data in the storage area-A in the memory section 13 via the arbiter 12. Every time record data for one row of error correcting codes, i.e., record data which becomes two frames of data information when recorded on the surface of the optical disk 7, is written in the storage area A, the parity adding circuit 14 which has received a detection signal from the arbiter 12 reads the record data written in the memory section 13 and adds the parity of an error correcting code to that record data.

At this time, the storage area B is used as a transmission area from which the transmission circuit 15 reads and sends the parity-added record data. The transmission circuit 15 sequentially reads such record data and supplies the data to the pickup 8 which records information on the optical disk 7 that is rotated by the motor 6.

In the second phase next to the first phase, record data is written in the storage area B, and every time record data for one row of error correcting codes is written there, the parity adding circuit 14 reads the written record data and adds the parity of an error correcting code to that record data. Meanwhile, the transmission circuit 15 sequentially reads out the record data that was added with a parity in the first phase and is now stored in the storage area A and sends the read record data to the pickup 8 which records information on the optical disk 7.

In the third phase following the second phase, as in the first phase, record data is written in the storage area A, and every time record data for one row of error correcting codes is written there, the record data is read out and subjected to the process of adding the parity of an error correcting code. Meanwhile, the record data that was added with a parity in the second phase is read out from the storage area B and is sent out. In this manner, while one of the two storage areas A and B is subjected to reception of record data and parity addition, the other one is used for the process of reading and transmitting parity-added record data. Those processing states are alternately switched from one to the other, phase by phase shown in FIG. 9.

FIG. 10 shows the states of the processes that are carried out in the two storage areas A and B at the initial stage (time "a" in FIG. 9) of the first phase. Writing of record data at the head address in the storage area A starts and parity-added record data is read out from the head address in the storage area B.

Next, as shown in FIG. 11, when the reception and transmission of record data in the first phase progress (time b in FIG. 9) so that record data for the first one row of error correcting codes is written in the storage area A and the flows goes to the writing of record data for the next one row of error correcting codes, the written record data is sequentially read from the head address in the storage area A and is subjected to the parity addition by the parity adding circuit 14. With regard to the storage area B, reading and transmission of record data has progressed to the next address by then; the processing states of the two storage areas A and B here are illustrated in FIG. 11.

FIG. 12 shows record data being recorded at the last address in the storage area A (time c in FIG. 9) as the reception of record data has progressed. At this time, the parity addition in the storage area A and the transmission process in the storage area B have progressed as illustrated.

The parity addition in the storage area A is progressing as if it followed the writing of record data in the storage area A. If the parity adding process goes ahead of the process of receiving record data and is erroneously performed on old record data which has not yet overwritten with the received data, the process of receiving record data and the parity adding process should be stopped and restarted from the head address. To prevent the occurrence of this incidence, for example, the speed at which the reception circuit 11 shown in FIG. 5 writes record data in the memory section 13 via the arbiter 12 has only to be set slightly higher than the speed of the parity adding circuit 14 to add a parity to record data.

Alternatively, a circuit which controls the speed of the parity adding process may be provided so that the speed of the parity adding process is altered adequately so as to prevent the parity adding process from going ahead of the process of receiving record data receiving process.

Figure 13:
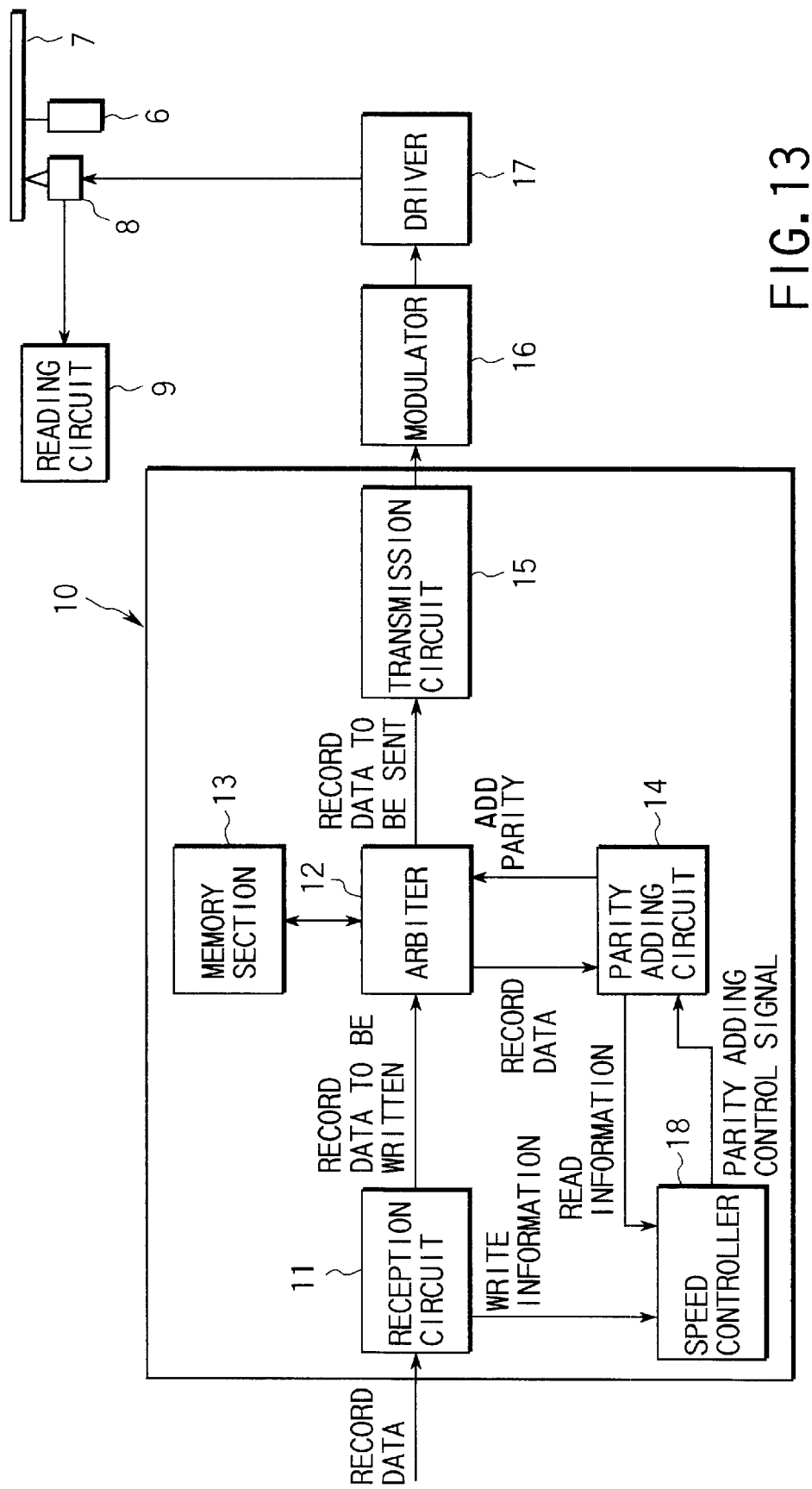
FIG. 13 is a block diagram illustrating a DVD-RAM system equipped with a parity-addition speed controller according to another embodiment of this invention.

FIG. 13 presents a block diagram of a DVD-RAM system equipped with a parity-addition speed controller according to another embodiment of this invention. A circuit 18 in the figure is a speed controller, which receives write information of record data in one of the storage areas in the memory section 13 and read information for reading the record data to undergo parity addition is read from this storage area from the reception circuit 11 and the parity adding circuit 14, respectively, and controls the parity-adding speed based on those information. The write information includes write address information for record data to be written in the memory section 13 via the arbiter 12 or a one-code-row-of-record-data write end signal for record data. The read information includes read address information for record data to be read out to the parity adding circuit 14 from the memory section 13 or a one-code-row-of-record-data read end signal.

Figure 14:
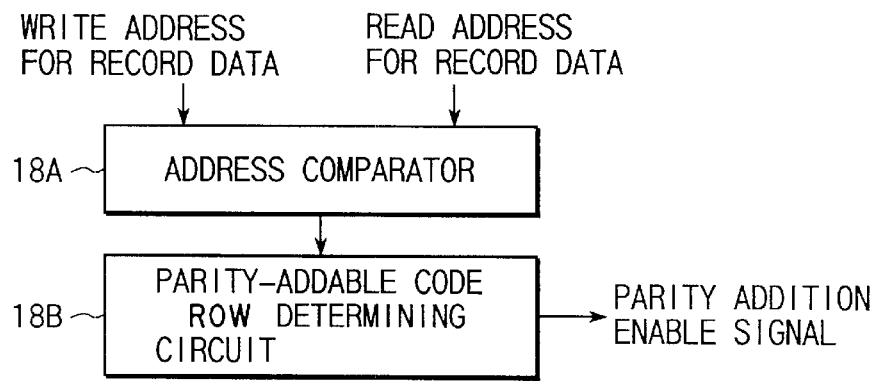
FIG. 14 is a block diagram showing one example of the structure of the parity-addition speed controller shown in FIG. 13.

For example, as shown in FIG. 14, the speed controller 18 comprises an address comparator 18A, which receives the write address information for record data and read address information, compares both items of address information with each other and outputs an address difference between both items of address information, and a parity-addable code row determining circuit 18B which receives a parity addition enable signal when this address difference includes an address difference equivalent to at least one code row of record data.

When this determining circuit 18B detects that the address difference or the interval between two addresses is equal to or smaller than a predetermined value, a control signal is sent to the parity adding circuit 14 to temporarily reduce the parity adding speed or temporarily interrupt the parity adding process.

One way of interrupting the parity adding process may be to temporarily stop the generation of a clock signal for forming an address signal to be sent to the memory section 13 from the parity adding circuit 14.

One way of temporarily reducing the parity adding speed is to use, for example, a VCO (Voltage Controlled Oscillator) as an oscillator which generates this clock signal and to temporarily reduce the oscillation frequency of this VCO based on the voltage on the control signal. Alternatively, the frequency of the clock signal may be frequency-divided to ½ by a frequency divider and to form an address signal using the output of the frequency divider. The frequency dividing ratio can be selected adequately. The generated or calculated parity is supplied to memory section 13 via the arbiter 12 so that the parity is added to the record data stored in the memory section 13 via the arbiter 12.

Figure 15:
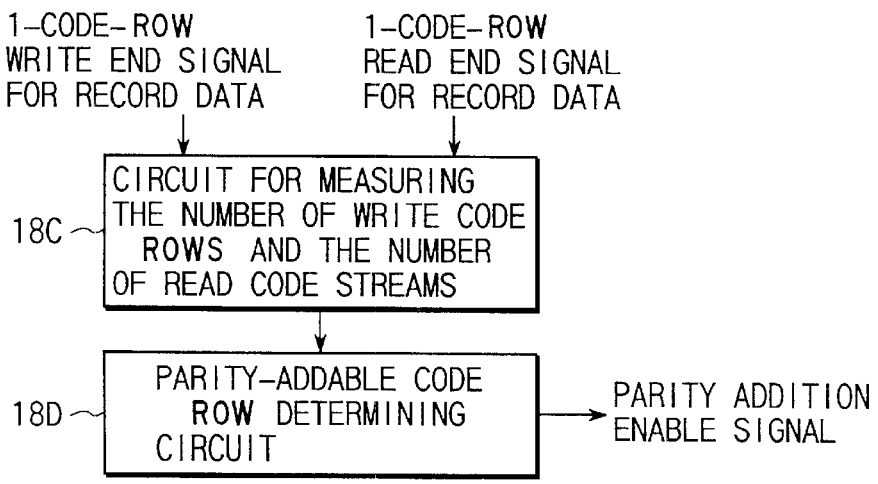
FIG. 15 is a block diagram showing another example of the structure of the parity-addition speed controller shown in FIG. 13.

FIG. 15 shows another example of the structure of the speed controller 18 shown in FIG. 13. A one-code-row-of-record-data write end signal for record data supplied from the reception circuit 11 as write information and a one-code-row-of-record-data read end signal for record data supplied from the parity adding circuit 14 as read information are supplied to a code-row number measuring circuit 18C, which counts both end signals. The count values are compared with each other. When the count value for the one-code-row write end signal for record data is larger than the count value for the one-code-row read end signal by at least one, a parity-addable code row determining circuit 18D sends a parity addition enable signal to the parity adding circuit 14. When the difference between both count values is zero, on the other hand, a control signal is sent to the parity adding circuit 14 to temporarily reduce the parity adding speed or temporarily interrupt the parity adding process.

The scheme of sending a control signal to temporarily reduce the parity adding speed or temporarily interrupt the parity adding process is the same as the one exemplified in FIG. 14.

According to this invention, as discussed above, while the memory capacity of the memory section is reduced to approximately twice the size of a parity-added data block, record data for one row of error correcting codes is received after which the process of receiving record data, the parity adding process and the process of transmitting record data are executed in parallel. This can significantly reduce the amount of data to which a parity has not been added at the time reception of one block of record data is completed; it is possible to eventually make such data to record data for one row of error correcting codes received last. It is therefore possible to execute data processing at a sufficiently high speed without increasing the processing speeds of the reception circuit and the parity adding circuit so much. This contributes to simplifying the circuit design.

Figure 16:
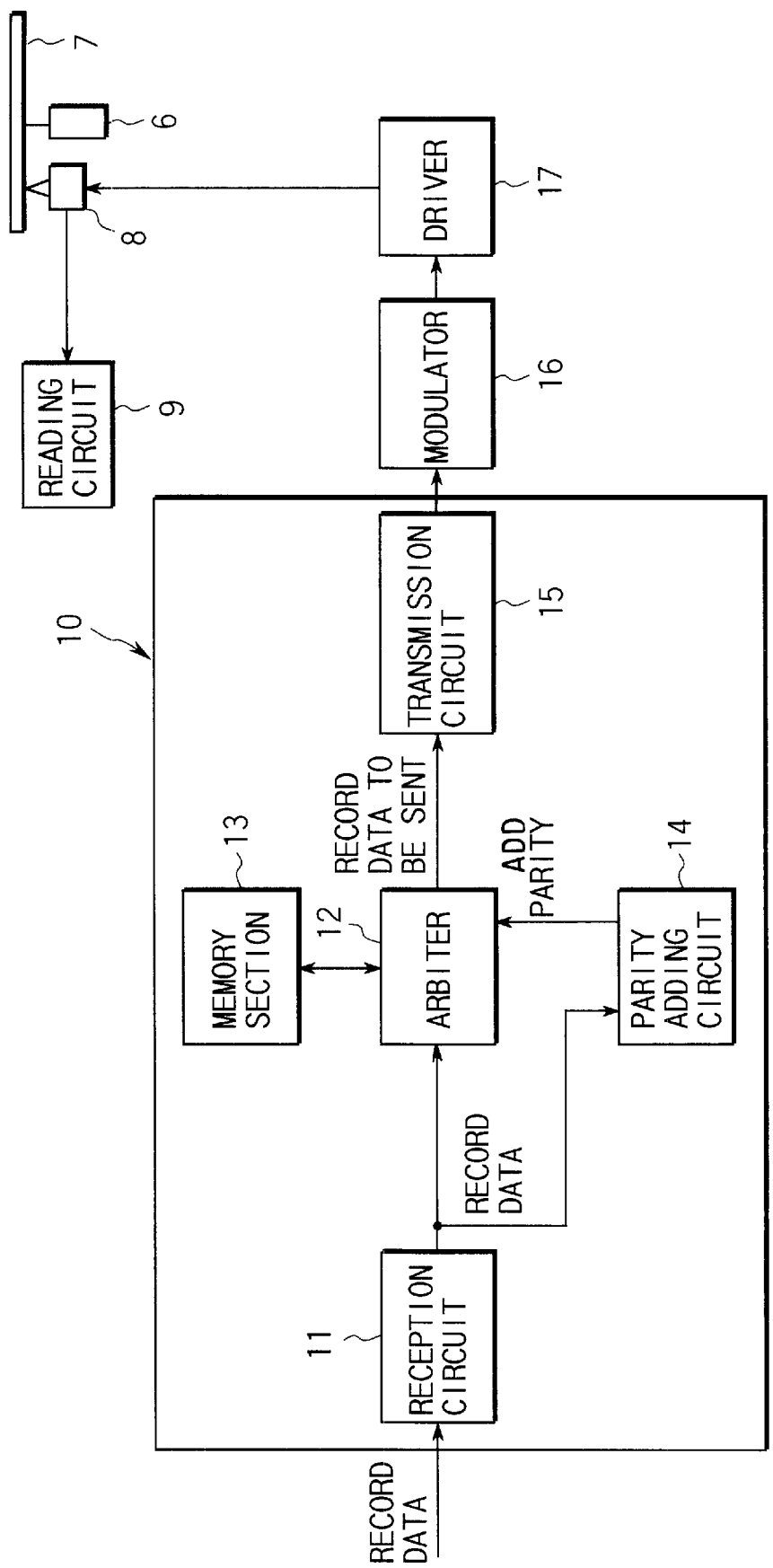
FIG. 16 is a block diagram illustrating a DVD-RAM system equipped with a parity adding circuit according to a further embodiment of this invention.

The embodiments have been explained with reference to the case where externally received record data is temporarily stored in the memory section and it is then read out and subjected to a process of adding the parity of an error correcting code. A modification for performing the parity addition process may be made in such a way that, as shown in FIG. 16, record data received by the reception circuit 11 from an external unit is supplied to the memory section 13 and the parity adding circuit 14. In response to the record data supplied to the parity adding circuit 14, a parity is generated or calculated in the parity adding circuit 14. The generated parity is supplied to the memory section 13 via the arbiter 12 to form the parity-added record data which is written in the memory section 13. In this case, while the operational speed of the signal processing system is controlled by the parity adding circuit 14, which makes it difficult to control the general operational speed, the structure around the memory section 13 becomes simpler because only record data to which parity is being added is stored in the memory section 13. The parity adding circuit 14 receives directly the record data from the reception circuit 11 and starts the generation of the parity upon reception of record data for one row of error correcting codes to be added to the record data stored in the memory section. The embodiment in FIG. 16 is the same as the one shown in FIG. 5 except for the above-described difference, so that like or same reference numerals are given to those components of the former embodiment which are the same as the corresponding components of the latter embodiment to avoid repeating their detailed description.

Figure 1:
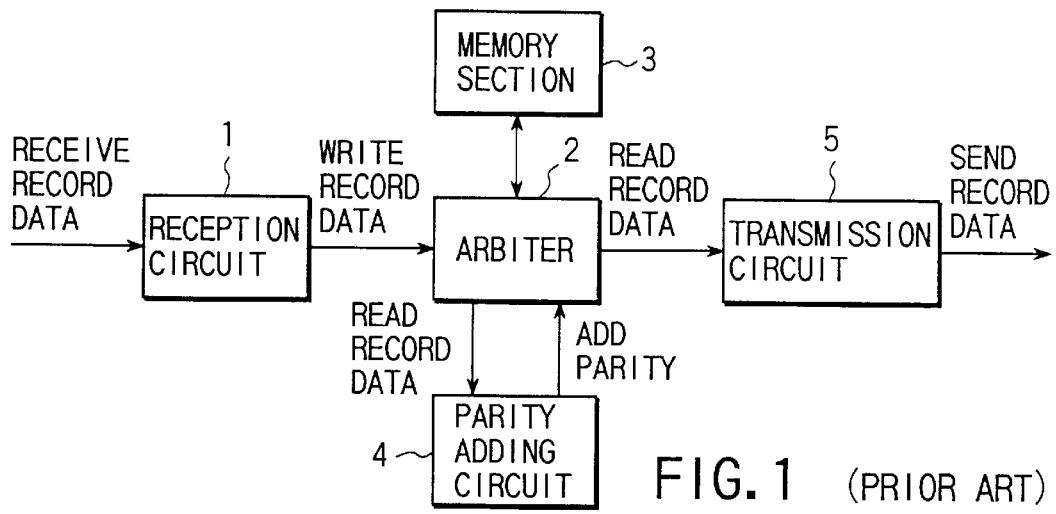
FIG. 1 is a block diagram showing a conventional signal processing circuit which is used to add the parity of an error correcting code to record data.
Figure 2:
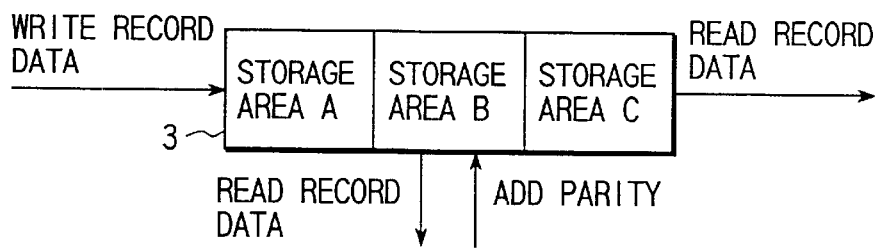
FIG. 2 is a diagram conceptually depicting a memory area in a memory section in the conventional signal processing circuit.
Figure 3:
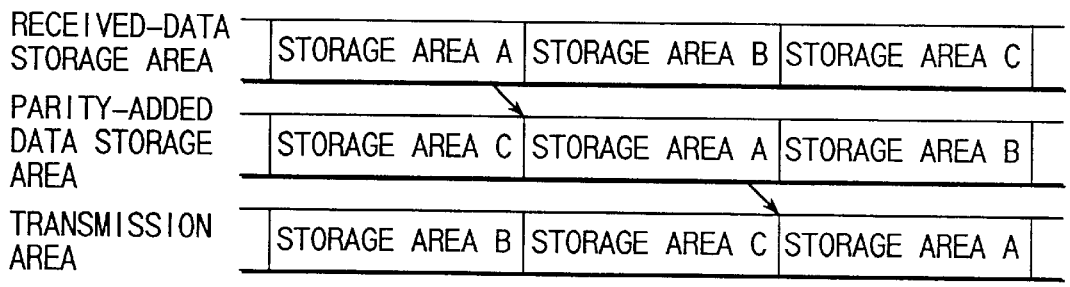
FIG. 3 is a diagram exemplarily showing a receiving process for record data, a parity adding process and a transmitting process for record data being carried out while switching the three storage areas A, B and C of the memory section from one to another according to the prior art.
Figure 4:
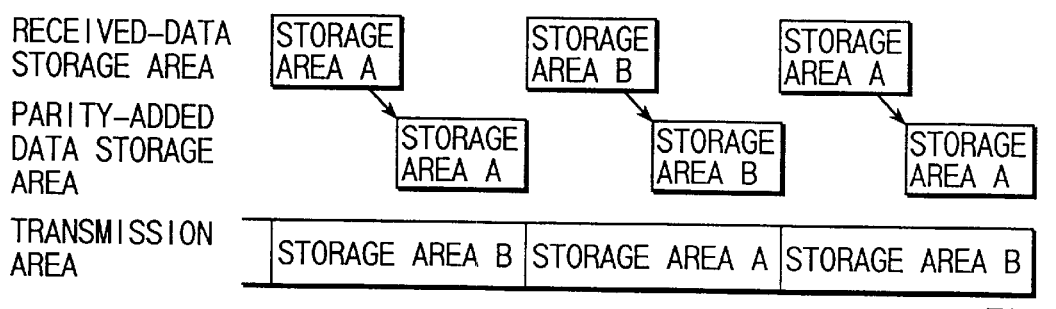
FIG. 4 is a diagram exemplarily shows the execution of a receiving process for record data, a parity adding process and a transmitting process for record data by switching the two storage areas A and B of a memory section from one to the other.

The arbiter 12 shown in FIG. 1 may be integrated with the memory section 13 or its function may be dispersed to the reception circuit 11, the parity adding circuit 14 and the transmission circuit 15 to provide those circuits with an ability to request an access to the memory section 13 and execute access arbitration. Further, the storage areas of the memory section in this invention may have a capacity greater than the size of one block of record data. It should be apparent to those skilled in the art that the present invention may be embodied in many other specific forms without departing from the spirit or scope of the invention.

As specifically described above, the signal processing circuit and information recording apparatus according to this invention can reduce the memory capacity of storage areas for record data which is used at the time of adding the parity of an error correcting code to the record data without causing a significant increase in the circuit load that is originated from an enhancement of the speed of processing record data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal processing circuit comprising:
   a reception section configured to receive record data;
   a memory section configured to store the record data received by the reception section;
   a parity adding section configured to add record data stored in the memory section with a parity based on an error correcting code in a unit of record data block; and
   a transmission section configured to transmit parity-added record data stored in the memory section;
   wherein the memory section has two storage areas each of which has a capacity for at least one record data block and which are alternately switched to a parity-added data storage area where record data added with the parity by the parity adding section is stored and a transmission area from which the parity-added record data is read and transmitted by the transmission section, the reception section is configured to receive the record data in an order matched with an order of rows of error correcting codes, and the parity adding section starts adding the parity to record data upon reception of record data for one row of error correcting codes.

2. The signal processing circuit according to claim 1, further comprising a control circuit for controlling a processing speed of said parity adding section to add the parity to record data.

3. The signal processing circuit according to claim 2, wherein said control circuit includes an address comparator for receiving write address information for record data to said memory section and read address information for record data from said memory section and outputting an output indicating an address difference between both of said write address information and said read address information, and a parity-addable code row determining circuit for receiving said address difference output from said address comparator and selectively outputting a parity addition enable signal when said address difference is not smaller than an address difference equivalent to at least one code-row of record data corresponding to one row of error correction codes.

4. The signal processing circuit according to claim 2, wherein said control circuit includes a code-row number measuring circuit for receiving a one-code-row write end signal for record data supplied from said reception section as write information and a one-code-row read end signal for record data supplied from said parity adding section as read information, and a parity-addable code row determining circuit for comparing a count value for said one-code-row write end signal with a count value for said one-code-row read end signal and outputting a parity addition enable signal when said count value for said one-code-row write end signal is larger than said count value for said one-code-row read end signal by at least one.

5. The signal processing circuit according to claim 1, further comprising an arbiter, connected between said parity adding section, said memory section and said transmission section, for controlling a flow of parity-added record data among those three sections.

6. The signal processing circuit according to claim 5, wherein said arbiter is configured to perform address designation to alternately switch said two storage areas of said memory section to said parity-added data storage area where record data added with said parity by said parity adding section is stored and said transmission area from which said parity-added record data is read and transmitted by said transmission section.

7. The signal processing circuit according to claim 5, wherein said arbiter is configured to detect a timing at which one code-row of record data corresponding to one row of error correcting codes is received by said reception section from a start end of the record data, whenever said reception section receives a block of record data, and to output a detection signal to said parity adding section.

8. An information recording apparatus comprising:
   a head section for recording information on a recording medium;
   a reception section configured to receive record data at a time of recording information on said recording medium;
   a memory section configured to temporarily store said record data;
   a parity adding section configured to add record data with a parity based on an error correcting code block by block; and
   a transmission section configured to transmit parity-added record data stored in said memory section,
   wherein said memory section has two storage areas each of which has a capacity for at least one block of said record data and which are alternately switched to a parity-added data storage area where record data added with said parity by said parity adding section is stored and a transmission area from which said parity-added record data is read and transmitted by said transmission section, the reception section is configured to receive the record data in an order matched with an order of rows of error correcting codes, and said parity adding section starts adding said parity to record data upon reception of record data for one row of error correcting codes.

9. The information recording apparatus according to claim 8, further comprising a control circuit for controlling a processing speed of said parity adding section to add the parity to record data.

10. The information recording apparatus according to claim 9, wherein said recording medium is one of a DVD-RAM, DVD-R, DVD+RW and DVD–RW.

11. The information recording apparatus according to claim 9, wherein said control circuit includes an address comparator for receiving write address information for record data to said memory section and read address information for record data from said memory section and outputting an output indicating an address difference between both of said write address information and said read address information, and a parity-addable code row determining circuit for receiving said address difference output from said address comparator and selectively outputting a parity addition enable signal when said address difference is not smaller than an address difference equivalent to at least one code-row of record data.

12. The information recording apparatus according to claim 9, wherein said control circuit includes a code-row number measuring circuit for receiving a one-code-row write end signal for record data supplied from said reception section as write information and a one-code-row read end signal for record data supplied from said parity adding section as read information, and a parity-addable code row determining circuit for comparing a count value for said one-code-row write end signal with a count value for said one-code-row read end signal and outputting a parity addition enable signal when said count value for said one-code-row write end signal is larger than said count value for said one-code-row read end signal by at least one.

13. The information recording apparatus according to claim 8, wherein said recording medium is one of a DVD-RAM, DVD-R, DVD+RW and DVD–RW.

14. The information recording apparatus according to claim 8, further comprising an arbiter, connected between said parity adding section, said memory section and said transmission section, for controlling a flow of parity-added record data among those three sections.

15. The information recording apparatus according to claim 14, wherein said arbiter is configured to perform address designation to alternately switch said two storage areas of said memory section to said parity-added data storage area where record data added with said parity by said parity adding section is stored and said transmission area from which said parity-added record data is read and transmitted by said transmission section.

16. The information recording apparatus according to claim 14, wherein said arbiter is configured to detect a timing at which one code-row of record data corresponding to one row of error correcting codes is received by said reception section from a start end of the record data, whenever said reception section receives a block of record data, and to output a detection signal to said parity adding section.

17. A signal processing circuit comprising:
a reception section configured to receive record data;
a parity adding section configured to add record data received by said reception section with a parity based on an error correcting code block by block in a unit of record data block;
a memory section configured to store said record data added with said parity by said parity adding section; and
a transmission section configured to transmit parity-added record data stored in said memory section,
wherein said memory section has two storage areas each of which has a capacity for at least one record data block and which are alternately switched to a parity-added data storage area where record data added with said parity by said parity adding section is stored and a transmission area from which said parity-added record data is read and transmitted by said transmission section, the reception section is configured to receive the record data in an order matched with an order of rows of error correcting codes, and said parity adding section starts adding said parity to record data upon reception of record data for one row of error correcting codes.

18. The signal processing circuit according to claim 17, further comprising an arbiter, connected between said parity adding section, said memory section and said transmission section, for controlling a flow of parity-added record data among those three sections.

19. The signal processing circuit according to claim 18, wherein said arbiter is configured to perform address designation to alternately switch said two storage areas of said memory section to said parity-added data storage area where record data added with said parity by said parity adding section is stored and said transmission area from which said parity-added record data is read and transmitted by said transmission section.

20. The signal processing circuit according to claim 18, wherein said arbiter is configured to detect a timing at which one code-row of record data corresponding to one row of error correcting codes is received by said reception section from a start end of the record data, whenever said reception section receives a block of record data, and to output a detection signal to said parity adding section.

* * * * *